F. H. CRINER.
MOLD.
APPLICATION FILED SEPT. 26, 1921.

1,410,169.

Patented Mar. 21, 1922.

INVENTOR.
Fred H. Criner
BY
Richey, Slough of Fales
ATTORNEY.

UNITED STATES PATENT OFFICE.

FRED H. CRINER, OF SEVILLE, OHIO.

MOLD.

1,410,169. Specification of Letters Patent. Patented Mar. 21, 1922.

Application filed September 26, 1921. Serial No. 503,151.

*To all whom it may concern:*

Be it known that I, FRED H. CRINER, a citizen of the United States, residing at Seville, Ohio, whose post-office address is care of The Seville Porcelain Company, Seville, Ohio, have invented certain new and useful Improvements in Molds; and I do hereby declare the following to be a full, clear, concise, and exact description of the invention, such as will enable others skilled in the art to which it a,. pertains to make and use the same.

Heretofore molds of this character have been held in upright position by placing them on upright pegs which pegs have been allowed to come in direct contact with the mold itself. The result has been that such molds have been frequently broken. My invention contemplates an improved arrangement that interposes a socket between the mold and the peg.

Among the objects of my invention are:

To provide a mold for use in making rubber gloves and the like with an improved socket terminal through the medium of which the mold can be held in standing position and removed from the stand readily without danger of breaking;

To provide details of improvement tending to increase thte efficiency and serviceability of a device of the above character.

To accomplish the foregoing and other useful ends my invention comprises means hereinafter more fully set forth and claimed.

Referring to the accompanying drawing.

Figure 1:
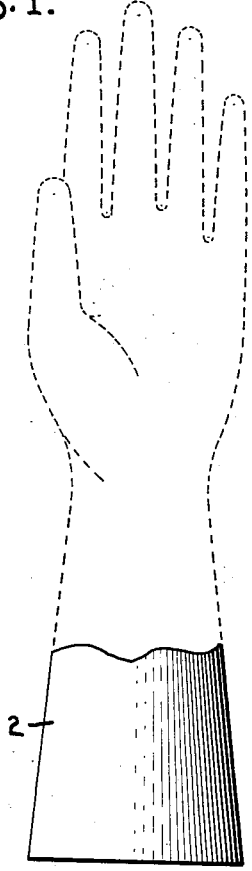
Fig. 1 is a view of the mold in elevation.
Figure 3:
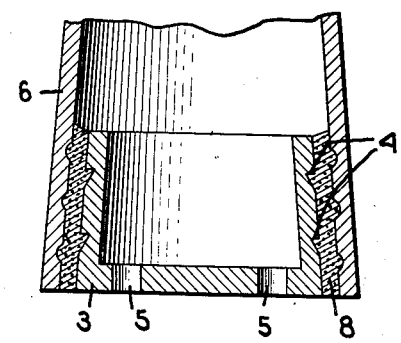
Fig. 3 is a section on line 3—3 Fig. 2 showing the socket cemented to the form.
Figure 4:
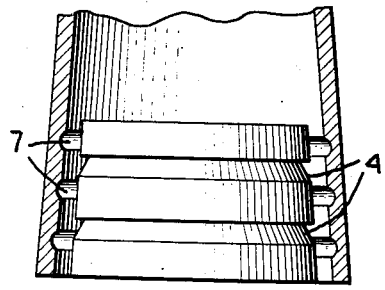
Fig. 4 shows the same without the cement.
Figure 2:
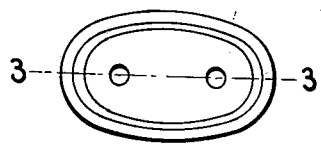
Fig. 2 is a bottom view thereof showing the socket attachment.

Referring more in detail to the figures, the form 2 is usually made of porcelain and I have devised a socket to be placed within the form as shown in Figs. 2 and 4 and cemented to the form as shown in Fig. 3. This socket, 3, is in the shape of a cup having corrugations, 4, on its outer side. In the bottom of the cup I have shown a pair of openings, 5, for receiving suitable pins or pegs when it is desired to have the form stand upright as shown in Fig. 1. On the inner side of the hollow section, 6, of the form there are also corrugations, 7, in the section overlapped by the walls of the plug, 3. In order to secure the plug to the form the section in between is filled with cement, 8, as shown in Fig. 3. It will be seen that if for any reason the socket, 3, is broken the same can be removed and a new one substituted. In this way the form is protected against destruction.

What I claim as my invention is:

1. A molding form having a hollow tubular section, a socket terminal therefor consisting of a corrugated cup-like plug inserted in said hollow section marked foremost, corrugations on the outer side of said socket, corrugations on the inner section of said form overlapped by said plug.

2. A molding form having a hollow tubular section, a socket terminal therefor consisting of a corrugated cup-like plug inserted in said hollow section marked foremost, corrugations on the outer side of said socket, corrugations on the inner section of said form overlapped by said plug, and cement between said sections securing the plug to the mold through the medium of said corrugations.

3. A molding form having a hollow tubular section, a socket terminal therefor consisting of a corrugated cup-like plug inserted in said hollow section marked foremost, corrugations on the outer side of said socket, corrugations on the inner section of said form overlapped by said plug, and cement between said sections securing the plug to the mold through the medium of said corrugations, the bottom of said cup being flush with the rim of the form, said cup having a pair of perforations in the bottom thereof for receiving a pair of pins whereby the form may be held in upright position.

In witness whereof, I have hereunto signed my name this 19th day of September, 1921.

FRED H. CRINER.